United States Patent [19]

Gibson et al.

[11] Patent Number: 4,659,873
[45] Date of Patent: Apr. 21, 1987

[54] FABRIC TOUCH SENSOR AND METHOD OF MANUFACTURE

[75] Inventors: William A. Gibson, Knox County; John E. Talmage, Jr., Anderson County, both of Tenn.

[73] Assignee: Elographics, Inc., Oak Ridge, Tenn.

[21] Appl. No.: 756,733

[22] Filed: Jul. 19, 1985

[51] Int. Cl.⁴ .............................................. G08C 21/00
[52] U.S. Cl. ...................................... 178/18; 338/99; 340/706
[58] Field of Search .............................. 178/18, 19, 20; 338/114, 99, 208; 340/206, 718, 724

[56] References Cited

U.S. PATENT DOCUMENTS 4,455,450 6/1984 Margolin .................................. 178/18
4,493,104 1/1985 Lukis et al. ......................... 178/18 X Primary Examiner—Stafford D. Schreyer
Attorney, Agent, or Firm—Pitts and Brittian

[57] ABSTRACT

A fabric touch sensor for providing positional information related to a touched region/points. The improved electrographic touch sensor (10) is fabricated using at least one resistive fabric layer (12) in the form of conducting threads. This fabric is constructed using either unidirectional threads (16) or crossed threads (16, 18) formed by overlaying one set with another or weaving the two sets together. The fabric (12) is separated from a second resistive layer (14) to prevent unintentional contact, with separators (24) in the form of non-conducting threads (42), insulator dots (24), or with an air gap. In a preferred embodiment, both resistive layers are fabrics (12, 14) formed from conductive threads. Prevention of Moire-type visual patterns is achieved by orienting the threads in one fabric layer at an oblique angle to those of the second fabric layer. This sensor results in ease of fabrication, reduction of cost, reduction of parallax and eliminates substrate problems associated with those sensors employing the same. No preforming is required to adapt this sensor to a contoured object (36) when both resistive layers are fabric.

31 Claims, 7 Drawing Figures

FABRIC TOUCH SENSOR AND METHOD OF MANUFACTURE

DESCRIPTION

1. Technical Field

The present invention relates to devices for inputting or determining the coordinates of a location in a two-dimensional system, and more particularly to an electrographic touch sensor employing simplified fabrication and materials of reduced cost resulting in lowered manufacturing costs.

2. Background Art

There are many fields of technology where it is desirable to generate electrical signals that are proportional to some physical point in a two-dimensional planar or non-planar coordinate system. For example, it is often desirable to interact with various forms of data presentation, to store such data in computers or input new information into the computer. Frequently devices for these applications are placed over a lighted display, typically a cathode ray tube.

A device which has come into use for this purpose is known as an electrographic sensor, generally known as a touch sensor, wherein orthogonal electrical fields produce an X-Y coordinate system. Contact of the sensor at a specific location with a finger or other object causes the generation of signals that are representative of the X and Y coordinates of that particular point.

Orthogonal X and Y electrical fields of the devices of this type have been generated by numerous types of systems. For example, parallel electrodes have been placed on opposite edges on two spaced apart sheets. The electrical field in one direction is generated in one sheet with a voltage applied to the set of electrodes on that sheet, and the orthogonal field is generated in the second sheet in a similar manner. In another form of touch sensor, the orthogonal electrical fields are generated in a single sheet using various configurations of electrodes along the edges of the sheet, with the electrical potential being applied to appropriate of those electrodes in a proper time sequence. A second sheet is used to make contact whereby the output signals are derived.

Typical of state-of-the-art touch sensors are those described in U.S. Pat. Nos. 3,911,215 and 4,220,815. These patents have a common assignee, Elographics, Inc., of Oak Ridge, Tenn., to the present invention. A rigid substrate, in the form of a sheet of glass, is coated on one side with a resistive layer in the form of an indium-tin-oxide coating. The substrate is either flat or, when the touch sensor is to be used over a curved display surface, is contoured to closely fit against that surface. Electrodes are positioned around the edge of the resistive coating whereby, with appropriate networks, the desired orthogonal electric fields are generated in the resistive coating. A flexible conductive sheet is placed proximate the resistive coating whereby pressure against this conductive sheet with a finger or other object causes the same to contact the resistive coating. Small islands or dots of insulation between the resistive coating and the conductive sheet prevent inadvertent contact.

Other embodiments of these typical touch sensors employ plastic as the substrate. While this reduces some problems associated with fabrication, the substrate must be preshaped if a curved sensor is desired. The curved substrates often do not closely match the tube curvature and because these sensors are relatively thick, some visual parallax results due to the offset from the display. Even with the use of plastic, fabrication costs are high. Also, plastic substrates are more subject to damage during use. These devices, both plastic and glass, require separate fixturing for the individual sizes that are to be fabricated.

A single-sheeted fabric sensor is shown and described in U.S. Pat. No. 4,442,317, issued to L. H. M. Jandrell on Apr. 10, 1984. This sensor employs a conductive fabric screen and a probe (stylus) to contact the screen at selected points to obtain positional information. This sensor, if the filaments are dark (e.g., black), provides an antiglare surface like that disclosed in U.S. Pat. No. 4,253,737 issued to E. J. Thomsen, et al.

A stylus-operated sensor is not considered a viable form of "communication" in the present market. It, like sensors operated by light pens, is outmoded for general applications. One of the problems is that discussed in the '317 patent; namely, physical wear caused by the stylus. However, the main problem is the non-acceptance by users.

Accordingly, it is a principal object of the present invention to provide a two layer touch sensor panel manufactured from relatively inexpensive materials as contrasted to conventional sensors.

It is another object to provide a two active sheet touch sensor construction that can be used over a curved surface display that does not require preforming of the sensor components.

Another object of the present invention is to provide a thin two active sheet touch sensor panel that substantially reduces visual parallax when used over a display.

It is a further object of the present invention to provide a light weight two active sheet touch sensor panel whereby mounting thereof relative to a display is simplified.

Still another object is to provide a two active sheet touch sensor panel fabricated from fabric which substantially reduces visual problems such as Moire-type patterns.

These and other objects of the present invention will become more apparent upon a consideration of the following drawings and a complete description of the invention.

SUMMARY OF THE INVENTION

In accordance with the present invention, a two sheeted touch sensor panel is provided wherein at least one of the active sheets thereof is fabricated from a fabric employing conductive threads. This fabric can be unidirectional threads, or can be threads woven or overlaid in multidirections. Care is taken in orientation of the threads to prevent Moire-type patterns when both active sheets are fabric. To minimize costs and thickness, both layers of the sensor utilize the fabric. The orthogonal electric fields can be generated in one fabric layer, or both layers can be utilized to obtain the orthogonal fields. The two layers are prevented from inadvertent contact (particularly for curved sensors) by insulating dots, insulating threads, or other suitable means distributed between the active sheets of the sensor. When the sensor is flat, an air gap provides sufficient separation.

IN THE FIGURES

DETAILED DESCRIPTION OF THE INVENTION

Figure 1:
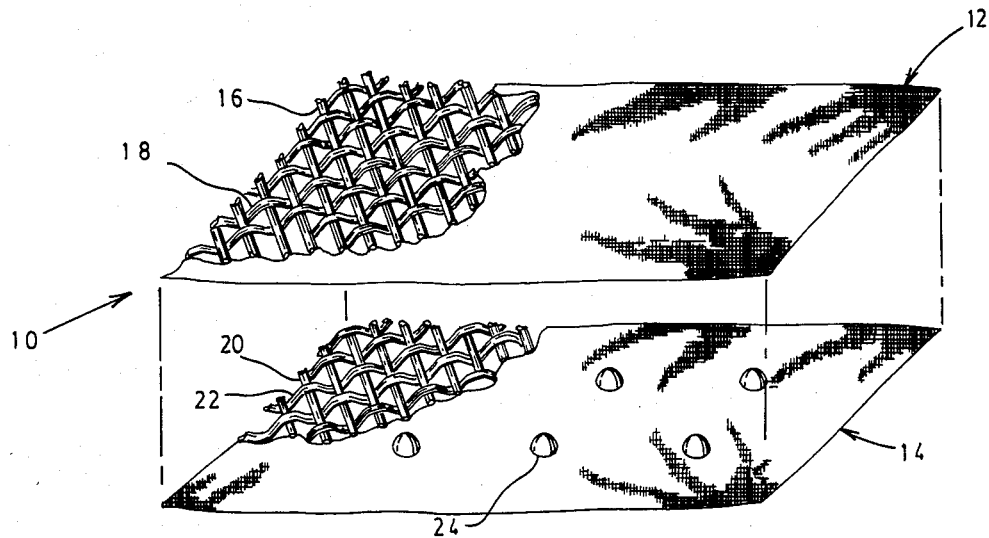
FIG. 1 is a fragmentary exploded view of one embodiment of a touch sensor panel of the present invention.

As set forth in the summary, the present invention is a touch sensor having two active sheets or layers in which at least one of these sheets is fabricated from a fabric made up of conducting threads. One embodiment of such a sensor is shown at 10 in FIG. 1. The size of the threads and their spacing have been exaggerated for purposes of illustration in this figure (and in FIGS. 3 through 5). In this fragmentary view, it can be seen that each of the sheets 12, 14 is a fabric made up of fine threads 16, 18 and 20, 22, respectively. These fabrics of this embodiment can be either interwoven woof and weft threads, or can have the threads just overlapping. Typically, these threads can be about 50 microns in diameter, with a resistance per unit length of about $2 \times 10^5$ ohms/cm. Such thread is available from Badische Corporation, Williamsburg, Va. (Badische type F-901, 20/1 conductive 6 monofilament). The threads typically are uniformly spaced on 0.050 inch centers throughout the fabric. It will be apparent to one versed in the art that a fabric having a specific resistivity can be produced by selecting the proper size, spacing, and resistivity of the thread. Although this FIG. 1 indicates that the threads are arranged perpendicularly, other orientations are within the scope of the present invention. Woven fabric can be used such as that available from TETKO, Inc., Elmsford, N.Y. (Type 3C-3C-130). This fabric contains threads of about 50 microns on 180 micron centers and has a sheet resistivity of about 3000 ohms per square.

Due to the highly flexible nature of fabrics, means are required when the sensor is curved to prevent inadvertent contact between sheets 12, 14 and yet permit contact when intentional pressure is applied at a point or small region on the top sheet (e.g., sheet 12). As in other touch sensors fabricated by Elographics, Inc., a suitable means of providing a separator to prevent the inadvertent contact is a selected distribution of small insulator islands or dots 24 attached to one of the sheets (e.g., sheet 14). The functions of these dots, and their method of formation, are described in the above cited '215 and '815 patents. Discussed hereinafter are other suitable separator means. When fabric sheets are used for a flat sensor, the fabric is stretched to impart tension in each of the threads. Due to the elastic nature of the threads they remain taut throughout use of the sensor whereby an air gap between the sheets serves as a separator.

Figures 2A, 2B:
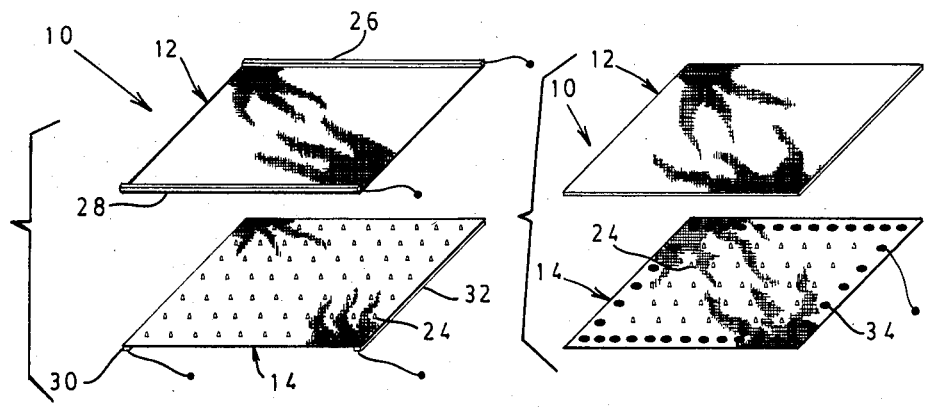
FIG. 2A is a drawing illustrating one means for generating orthogonal electropotentials in the touch sensor of FIG. 1.
FIG. 2B is a drawing illustrating an alternate means for generating orthogonal electropotentials in the touch sensor of FIG. 1.

In view of the resistivity of the thread/fabric, electrical potentials can be generated in the sheets 12, 14 in substantially the same manner as employed in conventional touch sensors. One method of accomplishing such generation is illustrated in FIG. 2A. In this figure, a pair of oppositely disposed bar-type electrodes 26, 28 is applied to sheet 12, with another pair of oppositely disposed electrodes 30, 32 applied to sheet 14 such that fields produced in the two sheets will be oriented orthogonally. Each sheet in this embodiment is thus a "single axis" sheet.

An alternate electrode construction is illustrated in FIG. 2B. This is the type of electrode construction (spot electrodes 34) utilized in the cited '215 and '815 patents; all electrodes 34 being on one sheet (e.g., sheet 14) such that the two orthogonal fields are both generated in this sheet. In this embodiment, the top sheet (e.g., sheet 12) receives the voltages at a touched point or the average voltage of a touched small region (the approximate voltage at the centroid of the touched region). This embodiment is referred to as a "two axis" sheet.

Although not shown, a further electrode configuration for application to the one sheet is that described in our co-pending patent application Ser. No. 685,348. It will be recognized, also, that other known electrode configurations applied to one or both of the sheets 12, 14 are within the scope of this invention.

Figure 3:
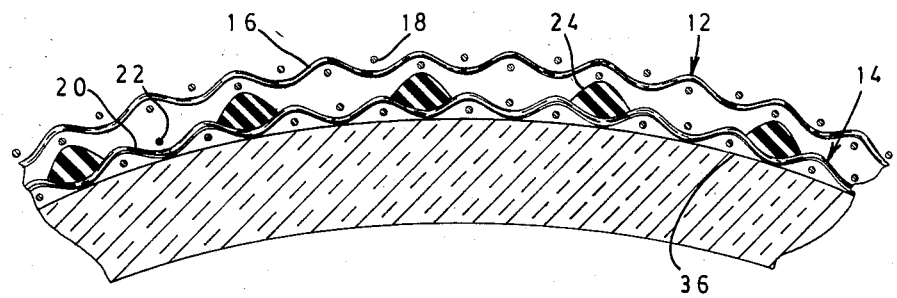
FIG. 3 is a fragmentary cross-section of the sensor of FIG. 1 when applied to a display having a curved (spherical, cylindrical, etc.) face.

No substrate is shown in FIGS. 1 or 2 which would add stability to the present touch sensor 10 panel; such may not be required for many applications of the sensor. That is one of the advantages of the construction. Often, as illustrated in FIG. 3, the display to which the sensor is applied supplies the effective substrate. In this figure, a face 36 of a video display is directly against the lower sheet (e.g., sheet 14) of the sensor panel. The curve of the face 36 and the thickness of the sensor components are exaggerated in this view in order to adequately show the same. It may be seen that the elimination of a separate substrate (as shown in the '215 and '815 cited patents) places the sensor directly on the tube and thus visual parallax is substantially reduced. Furthermore, the fabric fully conforms to the contour; thus, it can be seen that sensors do not need to be fabricated for a specific curvature as required in the non-fabric prior art.

Figure 4:
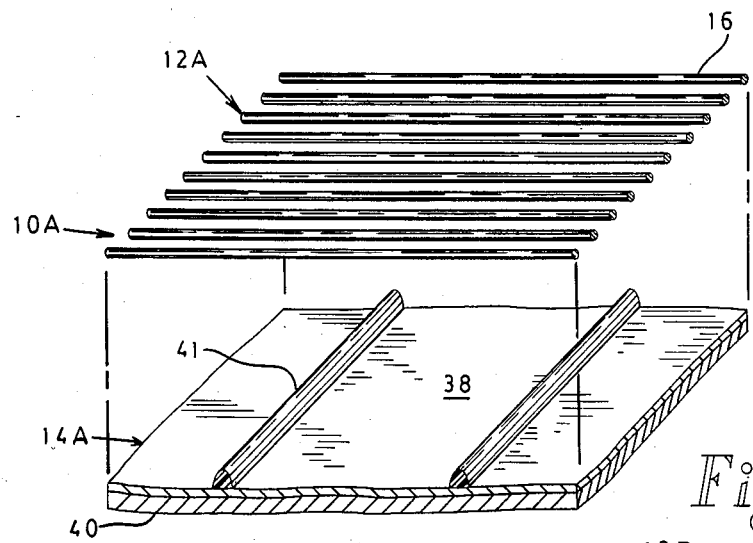
FIG. 4 is a fragmentary exploded view of another embodiment of the present invention.

FIG. 4 depicts at least two other possible embodiments of the present invention. In this view, the sensor 10A utilizes only an upper fabric sheet 12A. In this embodiment, sheet 12A is fabricated of only unidirectional threads 16; i.e., cross threads 18 are not present. While this construction may not be preferred for all applications, it is within the scope of the present invention. It should be recognized that the unidirectional threads 16 can have any desired orientation and not only the direction illustrated in this figure. If this sheet is to have bar-type electrodes attached thereto, as in FIG. 2A, the electrodes are attached so as to join ends of the threads 16 (current flow along the threads). The sensor 10A of FIG. 4 differs in a further way from the sensor 10 of FIGS. 1 through 3. In this embodiment, the second sheet 14A is made up of a non-fabric resistive layer or coating 38 as applied to a rigid, semiflexible or flexible substrate 40. The coating 38 can typically be a coating of the type identified in the above-cited '215 and '815 patents, namely an indium-tin-oxide, or any other suitable resistive material. Electrodes of conventional configuration are attached thereto for proper performance of the sensor. Typically separators in the form of lines of insulation 41 are attached to the coating 38 when the sensor is to be curved to normally maintain threads 16 separated from coating 38. These lines of insulation 41 (or threads as in FIG. 5) are oriented at a substantial angle (e.g., 90 degrees) to the resistive threads 16. Alternatively, the separator for curved sensors can be a grid of insulating lines or threads.

In connection with FIG. 4, although the fabric sheet is shown as being made up of unidirectional threads, a fabric cloth can also be used as one sheet with the resistive coating 38 as the second sheet.

Figure 5:
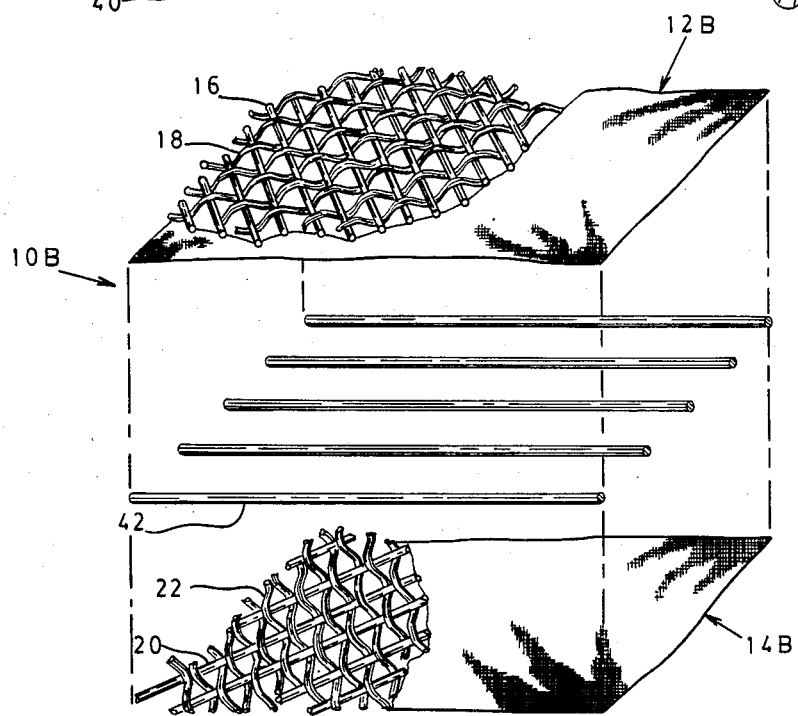
FIG. 5 is a fragmentary exploded view of a touch sensor of the type illustrated in FIG. 1 but with the fabric threads arranged to prevent Moire-type interference patterns, and thus prevent their distractions to a user.

When embodiments of the present sensor panel employing a pair of fabric sheets are utilized, care must be exercised to maximize light transmission if the sensor is to be used over a lighted display. Furthermore, the relatively high density of fine threads tends to produce Moire-type patterns and other detrimental visual effects. One method of minimizing such problems is illustrated in FIG. 5. In this embodiment, the upper sheet 12B is fabricated such that the threads 16, 18 thereof are oriented at an oblique angle to the threads 20, 22 of the lower sheet 14B. Typically an angular orientation of about 35 to 40 degrees will eliminate the Moire-type interference pattern. The exact orientation for any unit will depend upon the thread diameter and spacing, and the degree of correction that is desired. A reduction of the problem can be achieved by increasing the spacing between threads or by controlling the interrelation between the spacing of threads among the layers. In this embodiment of FIG. 5, non-conductive threads 42 serve as separators to prevent inadvertent contact between sheet 12B and sheet 14B.

The above-described embodiments are not limited to incorporation into video display equipment. However, they are most applicable to such incorporation whereby the bezel around a video tube covers the perimeter of the sensor including the electrodes, wiring, etc. There are applications where it is desirable to retrofit a video display with a touch sensor or to even temporarily apply a touch sensor to a video display. Preferably, substantially none of the display area should be eliminated from use.

Figure 6:
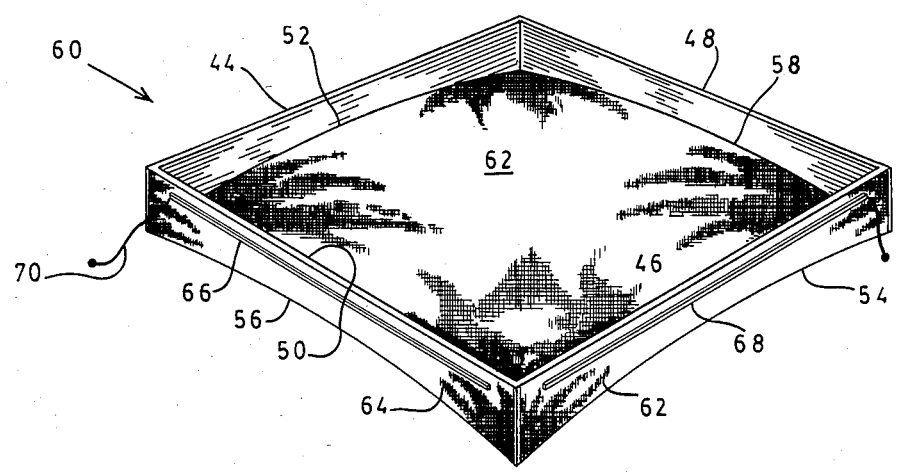
FIG. 6 is an isometric drawing illustrating an embodiment of the present invention which is of particular use for the retrofit of video display units.

An embodiment of the present touch sensor useful for retrofit and temporary applications is illustrated at 60 in FIG. 6. This embodiment utilizes an open frame having two pairs of opposite walls 44, 46, and 48, 50. Each of these walls is contoured along one edge (e.g., 52, 54, 56, 58) to substantially match the contour of a video tube face (not shown). Stretched across the edges 52–58, in substantially parallel orientation, are two fabric sheets 62, 64, with sheet 62 extending up the outer surface of walls 44, 46, and sheet 64 extending up the outer surface of walls 48, 50. The sheets 62, 64 are separated by any suitable means (insulating threads, etc.) throughout the region of overlap. If desired, reinforcing regions (not shown) can be included on the sheets where the sheets bend over the edges of the frame to prevent breakage of threads or other damage.

This construction permits the placement of electrodes, e.g., electrode 66 on sheet 64, at a location such that a minimum of usable area of the video display is covered. It will be understood that a second electrode would be attached to fabric sheet 64 on the outside of wall 48. Similarly, fabric sheet 62 has a pair of electrodes: electrode 68 on wall 46 and a second electrode (not shown) on the outside of wall 44. Each of the electrodes is provided with an electrical lead, such as lead 70 to electrode 66, whereby such electrodes are connected to appropriate circuitry. If desired, these leads can be provided within the walls of the frame.

It should be understood that the embodiment shown in FIG. 6 utilizes the generation of an electric field in one direction in sheet 62, and generation of an orthogonal field in sheet 64. This is like the sensor illustrated in FIG. 2A. Alternately, by using a different array of electrodes, a sensor equivalent to that of FIG. 2B can be constructed on the frame for retrofit and temporary applications.

Having described several specific embodiments of the present invention, it will become apparent to persons versed in the art that the sensor panel can be generally summarized and the variations of the components can be discussed. Although such a sensor can be used as an opaque sensor (not depending on light transmission), the following description is to a sensor that can be used on an display wherein light transmission through the sensor is desired. Such a sensor has the following three to five basic component layers listed in their order from the display surface out toward the touch panel user. These are: a substrate (optional); a first resistive layer; a separator; a second resistive layer; and an overlay (optional).

As indicated above with regard to FIG. 4, there are some applications of the fabric touch sensor panel where a substrate is desired to provide mechanical form and rigidity. This substrate can take the form of a glass panel, for example. Typically, this is a 1/16 inch (0.15 cm) to ⅛ inch (0.35 cm) thick glass sheet that is optically clear. For applications of the panel over contoured objects, the glass is preformed into a complimentary contour (e.g., spherical or cylindrical). Alternatively, the substrate can be a plastic sheet, preformed if necessary, of substantially the same thickness as the glass substrate. The plastic substrate, although less rigid, is more break resistant.

The first resistive layer and the second resistive layer have substantially the same choice of constructions. The following discussion for the layer closest to the display surface is thus generally applicable to the second resistive sheet or layer. This layer can be a single set of parallel conductive threads (like layer 12A of FIG. 4), such as the Badische threads described above, placed equal distances apart in the direction of current flow (i.e., for a single axis layer). Center-to-center thread spacing is selected to produce a desired light transmission and overall resistivity as required for a particular application of the fabric touch panel. Closer spacings reduce light transmission and increase electrical conductivity (reduced resistivity), whereas wider spacings have the opposite effect. Typical spacing for this single set of threads is between about 0.005 and 0.10 inches. These threads can have a resistivity from about $10^4$ to about $10^9$ ohms per inch.

The first resistive layer can also consist of two sets of conductive threads, with threads in each set being parallel. The second set would be positioned at some selected angle to those of the first set, and typically would be perpendicular to those of the first set, either overlayed on the first set or woven into a true fabric as woof and weft threads. Use of a second set of threads reduces the overall light transmission of the sensor; however, it provides a means of cross communication between all threads and improves the effective resistance uniformity of the layer and hence will provide more accurate positional information during use. With the combined sets of threads, this layer can be used either as a single axis sheet or as a combined two axis sheet. Spacing of the threads can be identical in both directions or can be selected to be nonidentical, for example, to balance the overall resistance in the two axis directions to compensate for aspect ratios. Closer spacings of the threads of the fabric (either two sets of threads) provide more fabric stability and thus the fabric is more easily handled in a production environment.

Still another construction for the first resistive layer is like that shown in FIG. 4, sheet 14A. This is a nonfabric layer and can consist of a resistive coating applied directly to a substrate. Typically this can be an indium-tin-oxide or a tin-oxide coating. This coating is especially useful to be operated as a two axis layer, and provides increased light transmission as compared to a fabric layer. It is, however, a more expensive form of resistive layer.

The purpose of a separator layer for the present invention is to inhibit contact between the two layers of resistive material and to control the amount of force required to achieve intentional contact therebetween. For example, some applications of the sensor are such that a higher amount of force is desirable before positional information is generated. In the case of curved sensors, the elastic nature of the threads would result in contact between the sheets unless some dispersed insulation means is employed. The cosmetic appearance of a sensor is an important factor, in the choice of a suitable separator.

One such separator means employs non-conductive threads that will be inconspicuous between the conductive threads (see FIG. 5). When using the aforementioned Badische threads for the resistive layers, which threads are black, black non-conductive threads of similar diameters (0.002 to 0.010 inches) on a spacing of about 0.1 to 0.3 inches will provide adequate separation between the resistive layers or sheets. Closer spacing requires more force to activate the sensor panel. Using a finger, for example, an activation force of 1 to 16 oz. can be obtained by thread spacing of between 0.1 and 0.2 inches when the separator threads have a diameter between 0.005 and 0.01 inches. The separator threads can be oriented horizontally, vertically, or at an angle. Prior use of threads, in the form of a net, as an insulator layer is described in U.S. Pat. No. 3,798,370, also assigned to Elographics, Inc.

Another separating means is a spaced-apart array of small insulating dots applied using a screen process or the like. This array can be a rectangular spacing, for example, of dots having a diameter of 0.005 to 0.025 inches and a height of up to a few thousandths of an inch (e.g., up to about 0.005 inch). Spacing of the dots, as well as the height, is used to select a desired activation force. Spacing is typically 0.025 to 0.50 inches. More details of the dot separators are given in the aforementioned '815 patent.

If the present fabric sensor is operated as a flat sensor in contrast to being curved, the layers normally will be maintained apart adequately by use of a physical spacer around the periphery of the sensor and an air gap in the operating portion of the sensor.

As stated above, the second resistive layer can be substantially like the first resistive layer, i.e., it can be a fabric of either unidirectional conductive threads, or two sets of threads oriented at an angle. In addition, it can be a non-fabric layer if the first resistive layer is fabric. The non-fabric embodiment can be an indium-tin-oxide coating, a metal film coating, or a multilayer composite conductive coating applied to a thin plastic film. Such a plastic film can act as a protective overlay layer, and its thickness is typically in the range of 0.001 to 0.015 inches.

When both resistive layers are fabric, detrimental visual effects can exist unless a construction is utilized to prevent the same. For example, the fine crossed threads of the two layers can create Moire-type interference patterns which are distracting to a user of the panel. These interference patterns can be eliminated by orienting the threads of one layer at an oblique angle to the threads of the other layer. In addition, wide spacing of threads minimizes the effects. Also, other controlled interrelation between the spacing of threads in the layers (including a thread layer as the separator) minimizes or eliminates the detrimental visual effects.

An overlay for the fabric sensor is optional; however, such overlay seals against possible contaminants, eliminates dust accumulation, provides abrasion resistance and reduces exposure to moisture. Since the fabric provides an excellent glare reduction (as in the '317 and '737 patents cited above), an overlay can reintroduce some glare. Also, an overlay adds complexity to the construction. If an overlay is to be used, it can be, for example, a thin transparent polyester sheet or similar formable material approximately 0.002 to 0.010 inch thick preshaped, if necessary, to the contour of the display device. Also, the overlay can be fabricated of a thin transparent elastomeric material such as polyurethane film. The elastomer would conform to the shape of the sensor and thus would not require preforming as in the case of the plastic overlay. Still another embodiment of an overlay would be provided by applying a non-conducting clear filler material to the second (top) fabric resistive layer.

A typical fabrication of a sensor according to this invention is as follows. A thin rectangular insulating frame is first provided which has an open central region for the transparent active area of the sensor and a non-transparent border region for the mounting of the other components. The frame material is flexible so that the resultant touch panel can be bent to conform to the surface of the display device. A single set of black non-conductive monofilament threads of 0.005 inch diameter are wound taut in a horizontal (X) direction around the frame in rows having a center-to-center spacing of 0.20 inches to produce the separator layer. Resistive black monofilament threads having a diameter of 0.002 inches and a resistance of $5 \times 10^5$ ohms per inch are then wound taut about the frame in a vertical (Y) orientation with a spacing of 0.05 inches. This provides one set of threads for the first and second resistive layers. A second winding of the same thread is applied horizontally (X) to produce the second set of threads for each layer. Thereupon, the threads are secured to the frame with an appropriate adhesive. This is followed by severing the connection of threads between the two layers.

Strip electrodes are applied to both sides of the frame to provide for the application of appropriate voltages to the fabric resistive sheets of the sensor panel. These electrodes can be applied either before the winding with the conductive threads, or after the winding is complete. Suitable connecting leads are attached to the electrodes so as to provide for connection to circuitry associated with the fabric panel.

From the foregoing, it will be apparent to one versed in the art that a touch sensor panel is provided having unique characteristics when compared to panels of the prior art. When both resistive layers are fabric, the panel is extremely thin and thus has little offset from a display device with the attendant reduction in parallax problems. There is no glass to create breakage problems, and the light weight and low profile reduce problems of mounting—and replacement—in cabinets containing a CRT or other display panel. The nature of the fabric substantially reduces problems of glare, and a proper orientation of one fabric layer with the other eliminates Moire-type visual interference problems. Lastly, the ease of contruction substantially reduces fabrication costs.

Although only specific embodiments of the present invention are shown and described herein, the invention is not intended to be limited by those embodiments. Rather, the scope of the invention is to be defined by these descriptions taken together with the attached claims and their equivalents.

We claim:

1. An electrographic sensor for providing positional information related to a selected point/region touched by a user, which comprises:
   a first sheet, capable of having electrical potentials introduced therein, extending across such sensor, said first sheet defining a perimeter;
   a further sheet, capable of having electrical potentials introduced therein, extending across such sensor, said further sheet defining a perimeter substantially conforming to said perimeter of said first sheet;
   separator means interposed between said first and further sheets for preventing contact between said first and further sheets until such sensor is touched by such user at such selected point/region;
   means for generating orthogonal electrical potentials within such sensor in X and Y directions whereby such positional information is provided in the form of electrical signals corresponding to X- and Y-coordinates of such selected point/region touched by such user; and
   wherein at least one of said first and further sheets is fabricated from a plurality of crossed electrically conductive threads forming a fabric.

2. The sensor of claim 1 wherein said electrically conductive threads are oriented orthogonally in said sheet.

3. The sensor of claim 1 wherein said electrically conductive threads are woven into said fabric.

4. The sensor of claim 1 wherein both said first and further sheets are fabric sheets fabricated from a plurality of crossed electrically conductive threads.

5. The sensor of claim 4 wherein said electrically conductive threads of said first sheet are oriented orthogonally in said first sheet, and said electrically conductive threads of said further sheet are oriented orthogonally in said further sheet.

6. The sensor of claim 4 wherein said electrically conductive threads are woven into said fabric in each of said first and further sheets.

7. The sensor of claim 5 wherein said electrically conductive threads of said first sheet are oriented at a selected angle with respect to said electrically conductive threads of said further sheet.

8. The sensor of claim 4 wherein electrically conductive threads are stretched taut on such sensor and said separator means comprises an air gap between said first and further sheets.

9. The sensor of claim 4 wherein said separator means comprises non-conductive threads oriented unidirectionally between said first and further sheets.

10. The sensor of claim 9 wherein said electrically conductive threads of said first and further sheets have a resistivity of about $10^4$ to $10^9$ ohms per inch, a diameter of about 0.001 to 0.01 inches and a spacing of about 0.005 to 0.1 inches.

11. The sensor of claim 1 wherein said separator means comprises non-conductive threads oriented unidirectionally between said first and further sheets, said non-conductive threads having a diameter of about 0.002 to 0.01 inches and a spacing of about 0.1 to 0.3 inches.

12. The sensor of claim 7 wherein said selected angle of orientation between threads of said first sheet and threads of said further sheet is chosen to substantially eliminate Moire-type interference patterns.

13. The sensor of claim 12 wherein said selected angle is about 35 to 40 degrees.

14. The sensor of claim 1 wherein one of said first and further sheets is a fabric sheet fabricated from crossed electrically conductive threads, and the remaining sheet comprises a uniformly distributed layer of a resistive substance.

15. The sensor of claim 14 wherein said remaining sheet comprises a substrate and a uniformly distributed resistive coating applied to a surface of said substrate disposed toward said fabric sheet.

16. The sensor of claim 15 wherein said separator means comprises a distribution of insulator dots applied to said resistive coating.

17. An electrographic sensor for providing electrical signals related to a selected point/region touched by a user, which comprises:
   a first fabric sheet fabricated from electrically conductive threads, said first fabric sheet defining a rectangular perimeter having pairs of opposite edges;
   a second fabric sheet, said fabric of said second sheet fabricated from electrically conductive threads, said second fabric sheet defining a rectangular perimeter conforming to said perimeter of said first fabric sheet having pairs of opposite edges;
   a first pair of electrode units attached to said first fabric sheet, each one of said first pair of electrode units attached to a pair of opposite edges of said first fabric sheet;
   a second pair of electrode units attached to said second fabric sheet each one of said second pair of electrode units attached to a pair of opposite edges of said second fabric sheet, said second pair of electrode units oriented orthogonally to said first pair of electrode units; and
   separator means interposed between said first and second fabric sheets for preventing contact between said sheets until such sensor is touched by such user at such selected point/region.

18. The sensor of claim 17 wherein said threads of said first and second fabric sheets are woven to form said sheets, said threads having a resistivity of about $10^4$ to $10^9$ ohms per inch, a diameter of about 0.001 to 0.01 inches, and a spacing between threads of about 0.005 to 0.1 inches; and wherein said electrode units are bar electrodes extending along said opposite edges.

19. The sensor of claim 17 wherein said separator means comprises an air gap and said threads of said first and second fabric sheets are taut to maintain said air gap.

20. The sensor of claim 17 wherein said separator means comprises a network of unidirectional non-conductive threads, said non-conductive threads having a diameter of about 0.002 to 0.01 inches, and a spacing between threads of about 0.1 to 0.3 inches.

21. The sensor of claim 17 wherein said first fabric sheet is fabricated from a first and a second set of electrically conductive threads, said first set oriented substantially perpendicular to said second set; said second fabric sheet is fabricated from a first and a second set of electrically conductive threads, said first set oriented substantially perpendicular to said second set; and where said first set of threads of said first fabric sheet are oriented at a selected angle to said first set of threads of said second fabric sheet, said selected angle being sufficient to substantially eliminate Moire interference patterns.

22. The sensor of claim 17 wherein spacing between said threads in said first sets within said first and second sheets is greater than spacing between said second sets.

23. An electrographic sensor for providing electrical signals related to a selected point/region touched by a user, which comprises:
- a first woven fabric sheet fabricated from perpendicularly oriented threads having a resistivity of about $5 \times 10^4$ ohms per inch, a diameter of about 0.002 inches and a spacing of about 0.05 inch, said first fabric sheet defining a rectangular perimeter having pairs of opposite edges;
- a second woven fabric sheet fabricated from perpendicularly oriented threads having a resistivity of about $5 \times 10^4$ ohms per inch, a diameter of about 0.002 inches and a spacing of about 0.05 inch, said second fabric sheet defining a rectangular perimeter having pairs of opposite edges conforming to said edges of said first fabric sheet, said second woven fabric sheet positioned whereby threads of said second woven fabric sheet are oriented at an angle of about 35 degrees to threads of said first woven fabric sheet;
- separator means interposed between said first and second fabric sheets, said separator means fabricated of unidirectional non-conducting threads having a diameter of about 0.005 inches and a spacing of 0.2 inches;
- a first pair of bar electrodes attached to said first woven fabric sheet, each one of said first pair of bar electrodes positioned at an opposite pair of said edges; and
- a second pair of bar electrodes attached to said second woven fabric sheet, each one of said second pair of bar electrodes positioned at an opposite pair of said edges of said second sheet, said second pair of bar electrodes oriented orthogonally to said first pair of bar electrodes.

24. An electrographic sensor for overlying a lighted display for providing electrical signals corresponding to positional information related to a selected point/region touched by a user, which comprises:
- a first fabric sheet capable of having electrical potentials introduced therein extending across such sensor, said first sheet defining a perimeter and being fabricated from first and second sets of electrically conductive threads, said first set and said second set oriented perpendicularly, said threads having a resistivity of about $10^4$ to $10^9$ ohms per inch, a diameter of about 0.001 to 0.01 inch and a spacing of about 0.005 to 0.1 inches said first sheet having a first surface for contact with such lighted display and a second surface;
- a second fabric sheet capable of having electrical potentials introduced therein extending across such sensor, said second sheet defining a perimeter and being fabricated from first and second sets of electrically conductive threads, said first set and said second set oriented perpendicularly, said threads having a resistivity of about $10^4$ to $10^9$ ohms per inch, a diameter of about 0.001 to 0.01 ohms per inch, and a spacing about 0.005 to 0.1 inches, said second sheet having a first surface and a second surface disposed toward said second surface of said first sheet;
- said first set of threads of said second fabric sheet oriented at a selected angle to said first set of threads of said first fabric sheet to substantially eliminate Moire-type interference patterns;
- means attached to such sensor for generating orthogonal electrical potentials within such sensor in X and Y directions, and for obtaining such electrical signals corresponding to positional information when such user touches such sensor at such selected point/region causing contact between said first and second fabric sheets;
- separator means interposed between said second surfaces of said first and second fabric sheets to prevent contact therebetween except when such sensor is touched by such user at such selected point/region, said separator means fabricated from unidirectional non-conducting threads having a diameter of about 0.002 to 0.01 inches and a spacing of about 0.1 to 0.3 inches; and
- a transparent overlay disposed on said first surface of said second fabric sheet.

25. A method of manufacturing an electrographic sensor for providing positional information related to a selected point/region touched by a user, which method comprises:
- fabricating a thin rectangular insulating frame defining a perimeter and a central open area conforming to an active area of such sensor, said frame having a vertical and horizontal orientation;
- securely mounting an insulating thread upon said frame in horizontal rows, said insulating thread having a diameter of about 0.002 to 0.01 inches, and each row being spaced apart about 0.1 to 0.3 inches;
- winding a first conductive thread vertically around said frame in substantially parallel rows, said first conductive thread having a resistivity of about $10^4$ to $10^9$ ohms per inch, a diameter of about 0.001 to 0.01 inches, and a spacing between rows of about 0.005 to 0.1;
- winding a second conductive thread horizontally around said frame in substantially parallel rows, said second conductive threads having a resistivity of about $10^4$ to $10^9$ ohms per inch, a diameter of 0.001 to 0.01 inches and a spacing between rows of about 0.005 to 0.1 inches thereby forming with said rows of said first and second conductive threads first and second fabric sheets separated by said insulating threads;

fastening said first and second conductive threads to said frame;

severing connections between said first and second fabric sheets at said perimeter of said frame; and attaching electrodes to said first and second fabric sheets whereby orthogonal electric fields can be produced within such sensor.

26. An electrographic sensor for providing electrical signals related to a selected point/region touched by a user, such sensor adapted to retrofit on a video display tube having a bezel with an opening which comprises:

an open frame adapted to be closely received within such opening of such bezel, said frame having two pairs of opposite side walls joined at corners, each of said walls having a contour along one edge to substantially match a face contour of such video display tube;

a first fabric sheet fabricated from electrically conductive threads stretched taut across said frame at said contoured edges and extended up and attached to outside surfaces of one pair of opposite side walls;

a second fabric sheet fabricated from electrically conductive threads stretched taut across said frame at said contoured edges and extended up and attached to outside surfaces of a second pair of opposite side walls;

separator means interposed between said first and second fabric sheets to prevent contact between said first and second fabric sheets until such sensor is touched by such user at such selected point/region; and electrode means attached to at least one of said fabric sheets for the application of electrical potentials to produce orthogonal electrical fields within such sensor whereby electrical signals corresponding to X- and Y-coordinates of such selected point/region are generated when such sensor is touched by such user.

27. The sensor of claim 26 wherein said separator means is an array of nonconductive threads stretched taut across said frame.

28. The sensor of claim 26 wherein said electrode means comprises:

a first pair of electrode units, each one of said first pair of electrode units attached to said first fabric sheet along said outside surface of said one pair of opposite side walls of said frame; and a second pair of electrode units, each one of said second pair of electrode units attached to said second fabric sheet along said outside surface of said second pair of opposite side walls of said frame.

29. The sensor of claim 26 wherein said threads of said first fabric sheet are oriented at a selected angle to said threads of said second fabric sheet, said selected angle being sufficient to substantially eliminate Moire interference patterns.

30. The sensor of claim 26 wherein said threads of said first and second fabric sheets have a resistivity of about $10^4$ to $10^9$ ohms per inch, a diameter of about 0.001 to 0.01 inches, and a spacing between threads of about 0.005 to 0.1 inches; and wherein said nonconductive separator threads have a diameter of about 0.002 to 0.01 inches, and a spacing between said nonconductive threads of about 0.1 to 0.3 inches.

31. An electrographic sensor for providing positional information related to a selected point/region touched by a user, which comprises:

a first sheet, capable of having electrical potentials introduced therein, extending across such sensor, said first sheet defining a perimeter;

a further sheet, capable of having electrical potentials introduced therein, extending across such sensor, said further sheet defining a perimeter substantially conforming to said perimeter of said first sheet;

separator means interposed between said first and further sheets for preventing contact between said first and further sheets until such sensor is touched by such user at such selected point/region;

means for generating orthogonal electrical potentials within such sensor in X and Y directions whereby such positional information is provided in the form of electrical signals corresponding to X- and Y-coordinates of such selected point/region touched by such user; and wherein at least one of said first and further sheets is a fabric sheet fabricated from a plurality of crossed electrically conductive threads oriented orthogonally in said fabric sheet.

* * * * *